United States Patent [19]
Holden

[11] Patent Number: 4,525,797
[45] Date of Patent: Jun. 25, 1985

[54] N-BIT CARRY SELECT ADDER CIRCUIT HAVING ONLY ONE FULL ADDER PER BIT

[75] Inventor: Kirk N. Holden, Lockhart, Tex.

[73] Assignee: Motorola, Inc., Schaumburg, Ill.

[21] Appl. No.: 455,091

[22] Filed: Jan. 3, 1983

[51] Int. Cl.³ .............................................. G06F 7/50
[52] U.S. Cl. .................................................. 364/788
[58] Field of Search ..................... 364/788, 787, 786

[56] References Cited

U.S. PATENT DOCUMENTS

| | | | |
|---|---|---|---|
| 3,100,835 | 8/1963 | Bedrij | 364/788 |
| 3,316,393 | 4/1967 | Ruthazer | 364/788 |
| 3,553,446 | 1/1971 | Kruy | 364/788 |
| 3,638,003 | 1/1972 | Meixner | 364/786 |
| 3,993,891 | 11/1976 | Beck et al. | 364/788 |

OTHER PUBLICATIONS

Bedrij, "Carry–Select Adder," *IRE Trans. on Electronic Computers*, Jun. 1962, pp. 340–346.

*Primary Examiner*—David H. Malzahn
*Attorney, Agent, or Firm*—Anthony J. Sarli, Jr.; Jeffrey Van Myers; Robert L. King

[57] ABSTRACT

An n-bit adder circuit, where n is an integer, for providing carry select addition of two input numbers is provided. A rank ordered plurality of section adders each have a plurality of full adders. Each full adder utilizes a single half adder to provide two sum bits which are coupled to a multiplexer which is an integral part of each section adder. One sum is for a carry-in and the other sum is for no carry-in. A method of minimizing logic circuitry which provides carry bits and carry sum select bits is provided. The carry bits and carry sum select bits control which of the two sums are provided by each section adder. By providing the carry bits and carry sum select bits in complement form every other order of section adder, logic circuitry and logic gate delays are minimized.

8 Claims, 10 Drawing Figures

N-BIT CARRY SELECT ADDER CIRCUIT HAVING ONLY ONE FULL ADDER PER BIT

Technical Field

This invention relates generally to computer arithmetic and, more particularly, to arithmetic circuits performing carry select addition.

BACKGROUND ART

Arithmetic logic units (ALUs) having n-bits, where n is an integer, and which perform carry select addition are well known in the art. As discussed in *Computer Arithmetic* by Kai Hwang (John Wiley and Sons, 1979, pp. 81–84), a carry select adder utilizes predetermined ranked subdivisions of two numbers which are to be added. Two sums for each of the predetermined subdivisions are typically generated by two parallel adder circuits. One sum corresponds to a sum having a carry-in bit of zero, and the other sum corresponds to a sum having a carry-in bit of one. The two sums of each subdivision are coupled to a multiplexer which couples a predetermined one of the sums to an output in response to a carry-in bit. Carry-out bits are generated for each sum and are coupled to logic means associated with each of the ranked subdivisions except the first subdivision. The logic means control the multiplexer of each subdivision and determine which of the two sums associated with each subdivision is coupled to an output. In carry select addition, carry propagation is reduced to a smaller bit ripple carry. Disadvantages however include the fact that two parallel adders exist for each of the predetermined subdivisions. The logic means associated with the ranked subdivisions greater than lowest rank also noticeably increase the physical size of the carry select adder circuit.

SUMMARY OF THE INVENTION

Accordingly, an object of the invention is to provide an improved n-bit adder circuit.

Another object of the invention is to provide an improved arithmetic circuit performing carry select addition.

Yet another object of the invention is to provide an adder circuit having improved operation speed and reduced size from adder circuits known in the art.

In carrying out the above and other objects, there is provided, in one form, an n-bit adder, where n is an integer, having a rank ordered plurality of parallel-connected section adders, for adding two n-bit numbers. A first input terminal of each section adder is adapted to receive a predetermined number of bits of the first n-bit numbers, and a second input terminal of each section adder is adapted to receive the same predetermined number of bits of the second n-bit number. A third input terminal of each section adder is capable of receiving a carry sum select bit from logic means which are coupled to section adders of lower rank and to an input carry-in bit. Each section adder comprises a predetermined number of full adder circuits and has an output sum terminal, for providing a portion of the sum of the two n-bit numbers and an output terminal for providing a carry sum select bit. Each full adder provides two partial sums of the predetermined portion of the n-bit number. The first partial sum is a sum generated for a carry-in bit and the second partial sum is a sum generated for no carry-in bit. Logic select means provide the correct carry sum select bit to each section adder in response to both the input carry-in bit and the first and second input numbers to provide the proper sum to the output sum terminal.

The above and other objects, features and advantages of the present invention will be more clearly understood from the following detailed description taken in conjunction with the accompanying drawings.

BRIEF DESCRIPTION OF THE DRAWINGS

FIGS. 1(*a*) and 1(*b*) illustrate in block diagram form an n-bit adder circuit constructed in accordance with a preferred embodiment of the present invention;

DESCRIPTION OF A PREFERRED EMBODIMENT

Figure 1A:
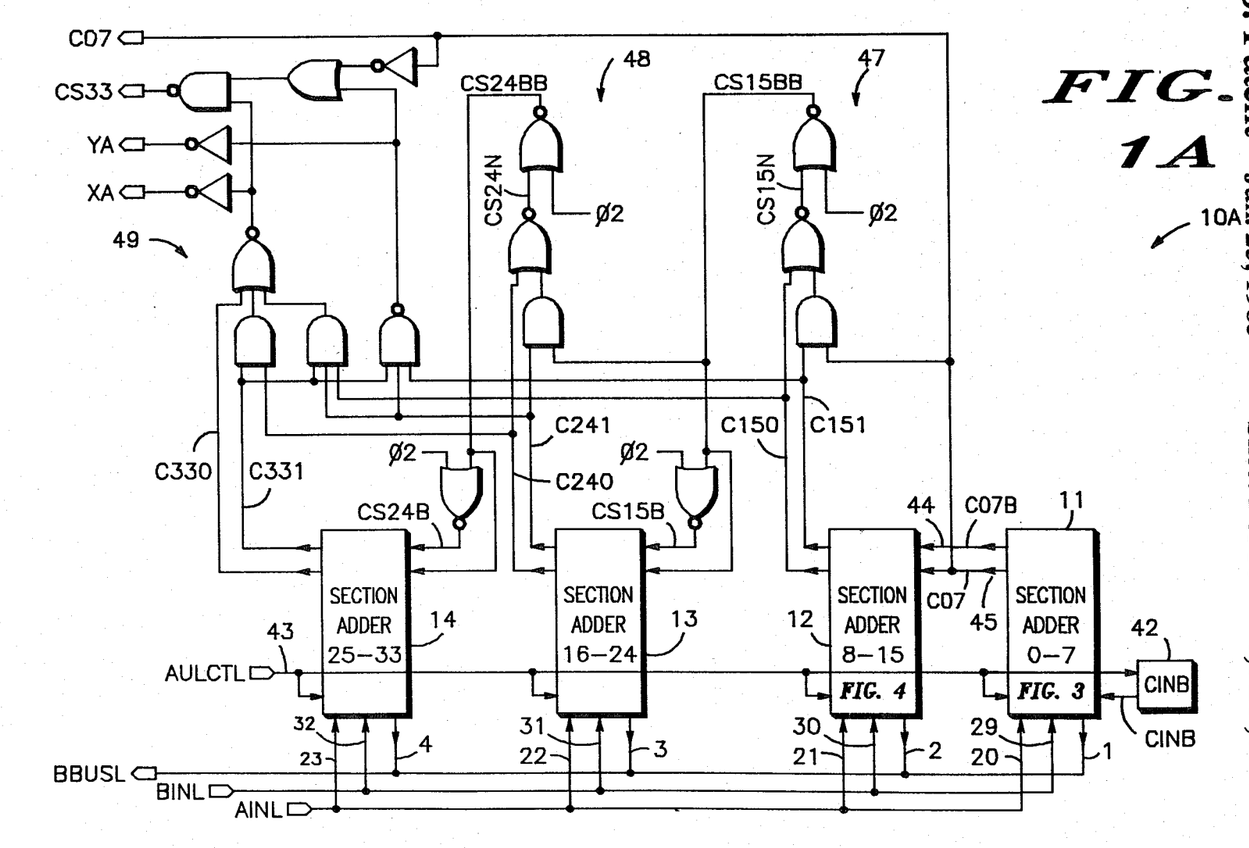
Figure 1B:
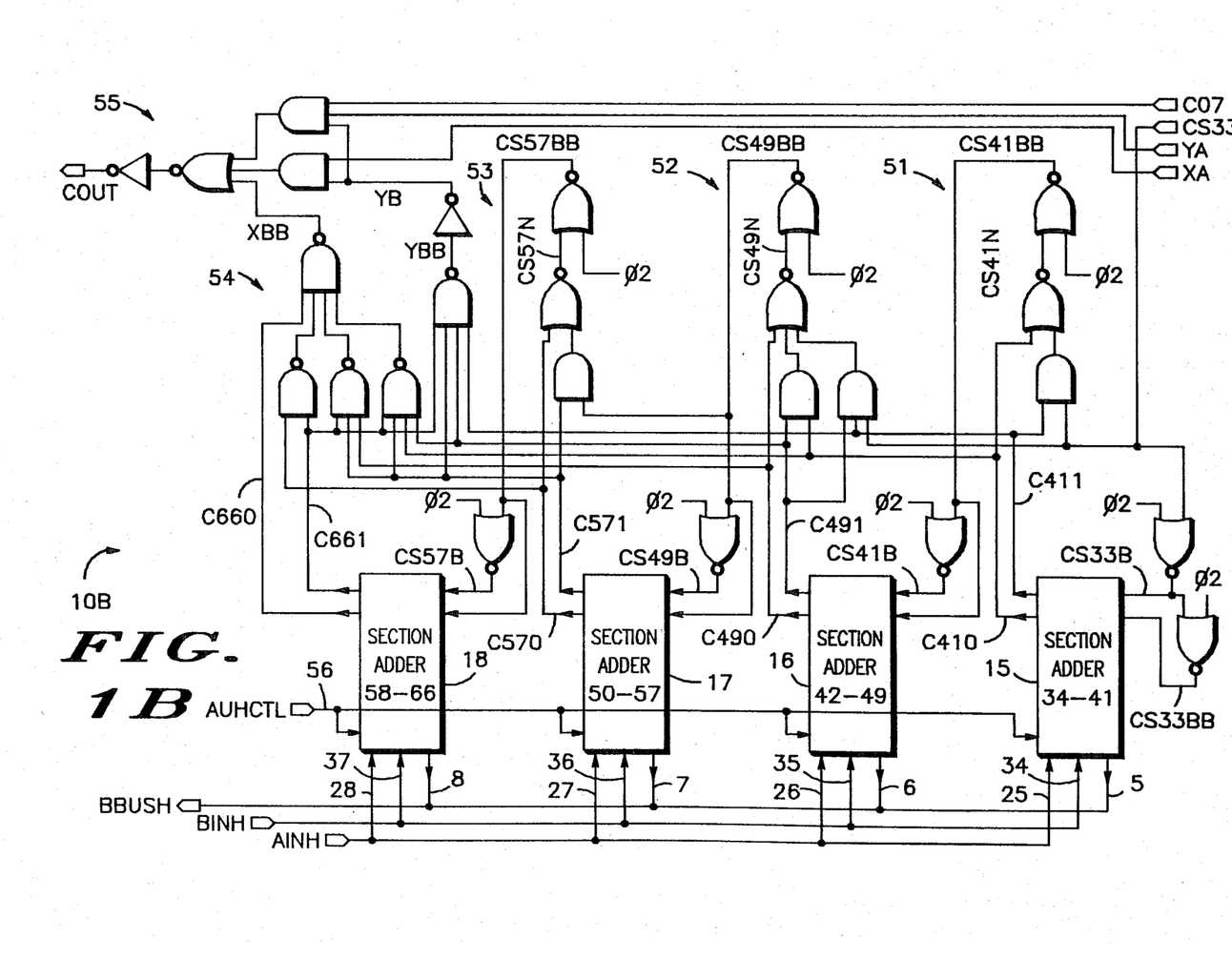

Shown in FIGS. 1(*a*) and 1(*b*) is an n-bit adder circuit having parts 10(*a*) and 10(*b*), respectively. For the convenience of illustration only, adder circuit 10 is shown in two separate portions although it is to be understood that both sections are intended to be coupled together and operate simultaneously.

Circuit outputs of FIG. 1(*a*) are coupled to corresponding labeled inputs of FIG. 1(*b*). Furthermore, although in a preferred form the adder circuit has eight adder sections having a total of sixty-seven bits, the invention may be practiced with any integer number of section adders and bits. Similarly, circuit devices which are illustrated are not limited in use or function by process type.

The adder circuit comprises a ranked ordered plurality of section adders 11–18 from lowest to highest rank, respectively. Section adder 11 has a first input for receiving bits zero thru seven of a first digital input number A. Similarly, section adders 12–18 each have a first input for receiving bits eight thru fifteen, sixteen thru twenty-four, twenty-five thru thirty-three, thirty-four thru forty-one, forty-two thru forty-nine, fifty thru fifty-seven, and fifty-eight thru sixty-six, respectively, of input number A. The first input of section adders 11–14 is coupled to an input terminal AINL for receiving the lower ordered bits of input number A via conductors 20–23, respectively. The first input of section adders 15–18 is coupled to an input terminal AINH for receiving the higher ordered bits of input number A via conductors 25–28, respectively. Section adder 11 has a second input for receiving bits zero thru seven of a second digital input number B. Similarly, section adders 12–18 each have a second input for receiving bits eight thru fifteen, sixteen thru twenty-four, twenty-five thru thirty-three, thirty-four thru forty-one, forty-two thru forty-nine, fifty thru fifty-seven, and fifty-eight thru sixty-six, respectively, of input number B. The second input of section adders 11–14 is coupled to an input terminal BINL for receiving the lower ordered bits of input number B via conductors 29–32, respectively. The second input of section adders 15–18 is coupled to an input terminal BINH for receiving the higher ordered bits of input number B via conductors 34–37.

Section adder 11 has an output for providing bits zero thru seven of a sum of input numbers A and B in complement form. Similarly, section adders 12–18 each have an output for providing bits eight thru fifteen, sixteen thru twenty-four, twenty-five thru thirty-three, thirty-four thru forty-one, forty-two thru forty-nine, fifty thru fifty-seven, and fifty-eight thru sixty-six, respectively, of the sum of input numbers A and B in complement form. The outputs of section adders 11–14 are coupled to an output bus terminal BBUSL for receiving the lower ordered output bits of the sum of numbers A and B via conductors 1–4, respectively. The outputs of section adders 15–18 are coupled to an output bus terminal BBUSH for receiving the higher ordered output bits of the sum of numbers A and B via conductors 5–8, respectively. Carry-in logic means 42 have an output coupled to a carry-in input terminal of section adder 11 to provide a complement carry-in bit CINB. Signal AULCTL controls the low order bits of the adder circuit and contains the three mutually exclusive input control signals AINNEGL, AINPOSL, and AINEQ0L and the output control signal ALUOUTL. Signal AUHCTL to be described below is an analogous control signal for the higher order bits of the adder circuit. A pair of carry-out conductors 44 and 45 are coupled from carry-out terminals of section adder 11 to sum select terminals of section adder 12. Conductors 44 and 45 couple a carry sum select bit of bit seven, C07, and its complement, C07B, respectively, to a multiplexer, such as multiplexer 123 of FIG. 7 to be explained below, which selects a sum with either a forced one carry-in or a forced zero carry-in. Section adder 12 provides two carry-out bits from bit fifteen, C150 and C151, for a carry-out with assumed carry-in of 0 and 1, respectively, on the lowest ranked full adder of section adder 12. Carry-in logic means 47 have three inputs coupled to carry-out bits C07, C150 and C151, respectively. Carry-in logic means 47 have first and second outputs, CS15BB and CS15B, coupled to a multiplexer which is part of section adder 13, analogous to multiplexer 123 below, which selects a sum with either a forced zero or forced one carry-in. Section adder 13 provides two carry-out bits from bit twenty-four, C240 and C241, for a carry-out with assumed carry-in of 0 and 1, respectively, on the lowest ranked full adder of section adder 13. Carry-in logic means 48 have three inputs coupled to carry bits CS15BB, C240 and C241, respectively. Carry-in logic means 48 have first and second outputs, CS24BB and CS24B, coupled to a multiplexer which is part of section adder 14, analogous to multiplexer 123 below, which selects a sum with either a forced one or forced zero carry-in. Section adder 14 provides two carry-out bits from bit thirty-three, C330 and C331, for a carry-out with assumed carry-in of 0 and 1, respectively, on the lowest ranked full adder of section adder 14. Carry-in logic means 49 have inputs coupled to the carry-out bits of section adders 11–14 for providing carry-out bits XA, YA and CS33 of section adders 11–14. Carry-out bit CS33 is coupled to the carry sum select inputs CS33BB and CS33B, which are coupled to a multiplexer which is part of section adder 15, analogous to multiplexer 123 below, which selects a sum with either a forced one or a forced zero carry-in. Section adder 15 provides two carry-out bits from bit forty-one, C410 and C411, for a carry-out with assumed carry-in of 0 and 1, respectively, on the lowest ranked full adder of section adder 15. Carry-in logic means 51 have inputs coupled to carry-out bits of section adder 15 and carry logic means 49, and first and second outputs, CS41BB and CS41B, coupled to a multiplexer which is part of section adder 16, analogous to multiplexer 123 below, which selects a sum with either a forced one or forced zero carry-in. Section adder 16 provides two carry-out bits from bit forty-nine, C490 and C491, for a carry-out with assumed carry-in of 0 and 1, respectively, on the lowest ranked full adder of section adder 16. Carry-in logic means 52 have inputs coupled to carry-out bits of section adders 15 and 16 and carry logic means 49, and first and second outputs, CS49BB and CS49B, coupled to a multiplexer which is part of section adder 17, analogous to multiplexer 123 below, which selects a sum with either a forced one or forced zero carry-in. Section adder 17 provides two carry-out bits from bit fifty-seven, C570 and C571, for a carry-out with assumed carry-in of 0 and 1, respectively, on the lowest ranked full adder of section adder 17. Carry-in logic means 53 have inputs coupled to carry-out bits of section adder 17 and carry logic means 52, and first and second outputs, CS57BB and CS57B, coupled to a multiplexer which is part of section adder 18, analogous to multiplexer 123, which selects a sum with either a forced zero or a forced one carry-in. Section adder 18 provides two carry-out bits from bit sixty-six, C660 and C661, for a carry-out with assumed carry-in of 0 and 1, respectively, on the lowest ranked full adder of section adder 18. Carry-in logic means 54 have inputs coupled to both carry-out bits of section adders 15–18 for producing complement YB and XB carry-out bits of section adders 15–18 and denoted as YBB and XBB, respectively. Carry-out logic means 55 have inputs coupled to YA, XA, YB, XBB and C07 for providing a carry-out bit, COUT, for the sixty-seven bit sum of input numbers A and B. An arithmetic unit control signal AUHCTL is coupled to control inputs of the higher ordered section adders 15–18 via conductor 56.

In operation, input numbers A and B have sixty-seven bits each. The first thirty-four bits of numbers A and B are coupled to input terminals AINL and BINL, respectively, while the remaining thirty-three bits of numbers A and B are coupled to input terminals AINH and BINH, respectively. All bits of input numbers A and B are loaded into section adders 11–18 in parallel simultaneously. Although section adders 13, 14 and 18 contain nine bits of each input number and all other section adders contain eight bits of each input number, the invention may be practiced with any variety of bits in a plurality of section adders. Once each section adder has its respective input bits of numbers A and B presented to a respective input, section adders 11–18 immediately add the respective bits of numbers A and B. Simultaneously, a carry-in bit is presented to section adder 11 by carry-in logic means 42. Since none of the section adders immediately know whether to use a carry-in of one or zero as determined by bit CINB and any two given input numbers, two sums are generated by each section adder. One sum assumes a carry-in input of zero and the second sum assumes a carry-in input of one.

Figure 2:
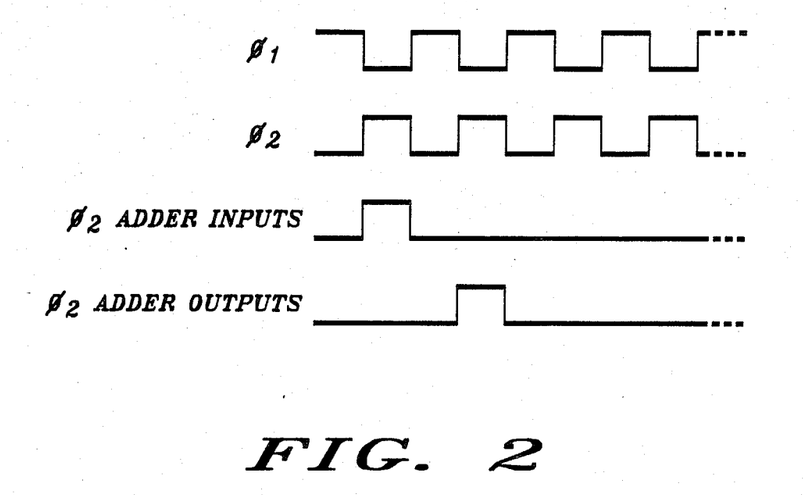
FIG. 2. illustrates in graphical form control signals associated with the n-bit adder circuit of FIGS. 1(*a*) and 1(*b*)

Shown in FIG. 2 is a simplified timing diagram for adder circuit 10. A system clock $\phi_2$ of predetermined frequency determines the sequence of adding and outputting. During the presence of clock $\phi_2$, the section adder input bits (adder inputs) and the control signals AULCTL and AUHCTL, all section adders perform addition operations to provide two sums. Simultaneously, a ripple carry is produced by carry-in logic means 47–49 and 51–55. Once a carry-in bit is presented to each section adder, the respective section adder selects the proper sum of the two calculated sums. A carry-out bit for the sixty-seven bit sum is coupled to the COUT terminal. The group carries XA and YA related to the lower order bits and the group carries XB and YB related to the higher order bits are defined by the equations:

$$XA = C_{15}°C_{24}'C_{33}' + C_{24}°C_{33}' + C_{33}° \quad (1)$$

$$YA = C_{15}40\ C_{24}'C_{33}' \quad (2)$$

$$XB = C_{41}°C_{49}'C_{57}'C_{66}' + C_{49}°C_{57}'C_{66}' + C_{57}°C_{66}' + C_{66}° \quad (3)$$

$$YB = C_{41}'C_{49}'C_{57}'C_{66}' \quad (4)$$

where carries $C_i'$ and $C_i°$ are generated in each eight or nine bit section adder and where i is an integer indicating the bit which generates the carry and the superscript indicates whether the carry is from a forced one carry chain or a forced zero carry chain. The carries from the lower bit group and the higher bit group are combined to generate carry bits CS33 and COUT according to the following equations:

$$CS33 = C_{07}YA + XA \quad (5)$$

and $$COUT = C_{07}YA\ YB + XA\ YB + XB. \quad (6)$$

Input signals AINL, BINL, AINH and BINH are coupled to the inputs of adder 10 via conductors AULCTL and AUHCTL, respectively, during $\phi_2$ ($\phi_2$ adder inputs). The adder results are available to be coupled onto BBUSL and BBUSH output busses on the successive occurrence of $\phi_2$ in a high logic state ($\phi_2$ adder outputs) shown in FIG. 2. It should be noted that inputs can be sourced to adder 10 on every $\phi_2$ clock with results available at the output terminals on the successive $\phi_2$ clock. In this manner, adder 10 quickly performs carry-select addition in one clock cycle by using a reduced number of gate delays in the carry chain.

Figure 3:
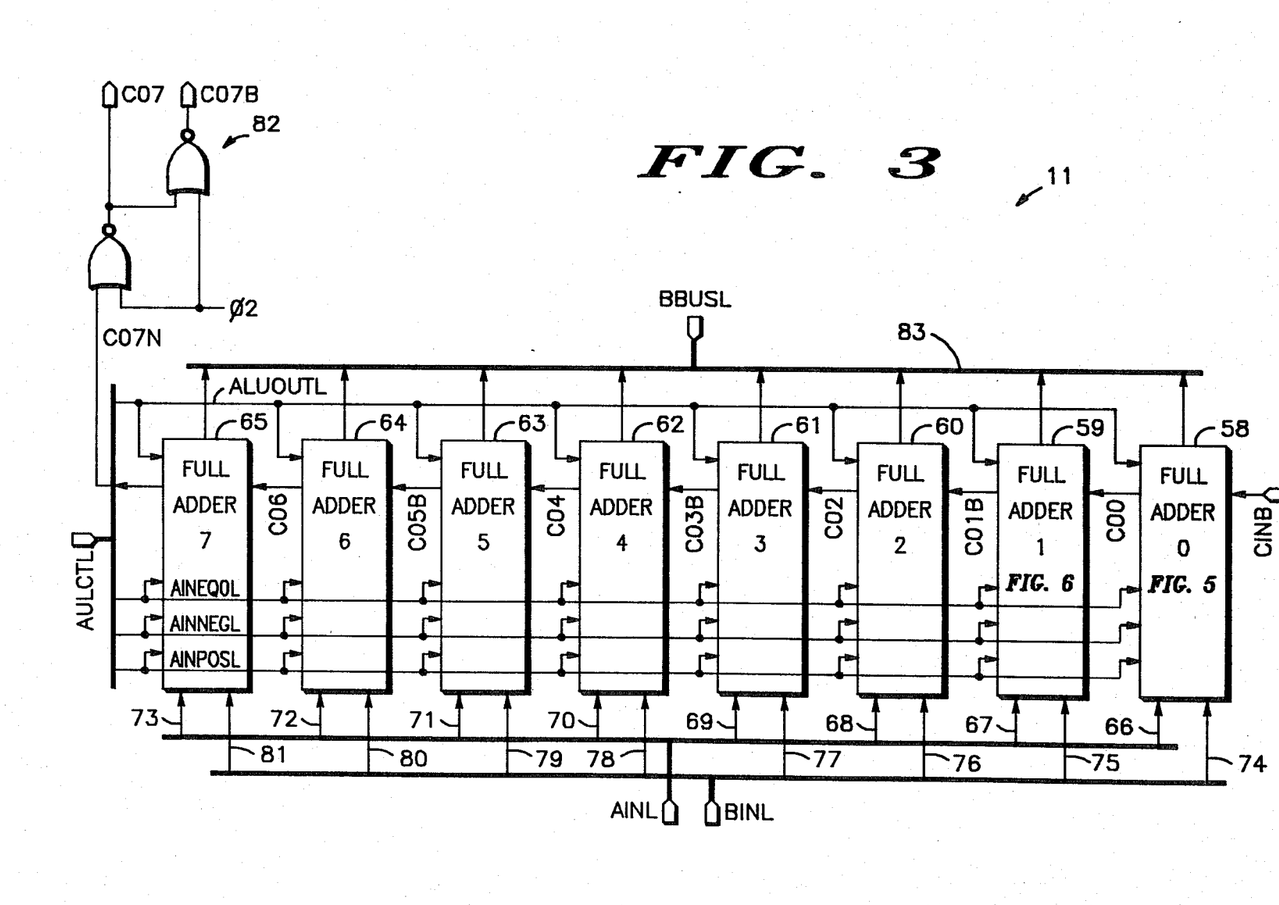
FIG. 3 illustrates in block diagram form a first complete section adder of the n-bit adder circuit of FIGS. 1(*a*) and 1(*b*)

Shown in FIG. 3 is a block diagram of section adder 11 of FIG. 1(a). Section adder 11 comprises a rank ordered plurality of full adders 58–65. Full adders 58–65 correspond to bits zero thru seven, respectively. Full adders 58–65 each have a first input coupled to a first input terminal AINL via conductors 66–73, respectively. A second input of full adders 58–65 is coupled to a second input terminal BINL via conductors 74–81, respectively. The complement of the carry-in input bit, CINB, is coupled to full adder 58. A carry-out output of full adders 58–65 is coupled to a carry-in input terminal of the section adder of next higher rank. A complement carry-out output is coupled from full adders 59, 61, 63 and 65, whereas a carry-out output is coupled from full adders 58, 60, 62 and 64. A complement carry-out output terminal of full adder 65 is coupled to carry-out logic means 82, which provide a carry-out bit and its complement, C07 and C07B, respectively, for section adder 11. Each of full adders 58–65 has four control inputs. Signal AINNEGL controls ones complement addition, signal AINEQ0L inputs logical zero, signal AINPOSL inputs the AINL logic levels, and signal ALUOUTL controls output load. Each of full adders 58–65 has an output coupled to an output bus 83 for providing the complement sum bits of input numbers A and B for bits zero thru seven.

As previously mentioned, during the operation of section adder 11, the sum of the input numbers A and B with a known carry-in bit, CINB, is generated by each full adder. Only one sum is generated by section adder 11. However, as will be explained below, all other section adders 12–18 provide two sums. Simultanouesly, complement carry-in bit CINB is coupled to full adder 58 and a carry bit ripples through full adders 58–65 to provide a carry-out bit, C07, for the partial sum having bits zero thru seven. The output sum is then selectively coupled to output bus 83.

Figure 4:
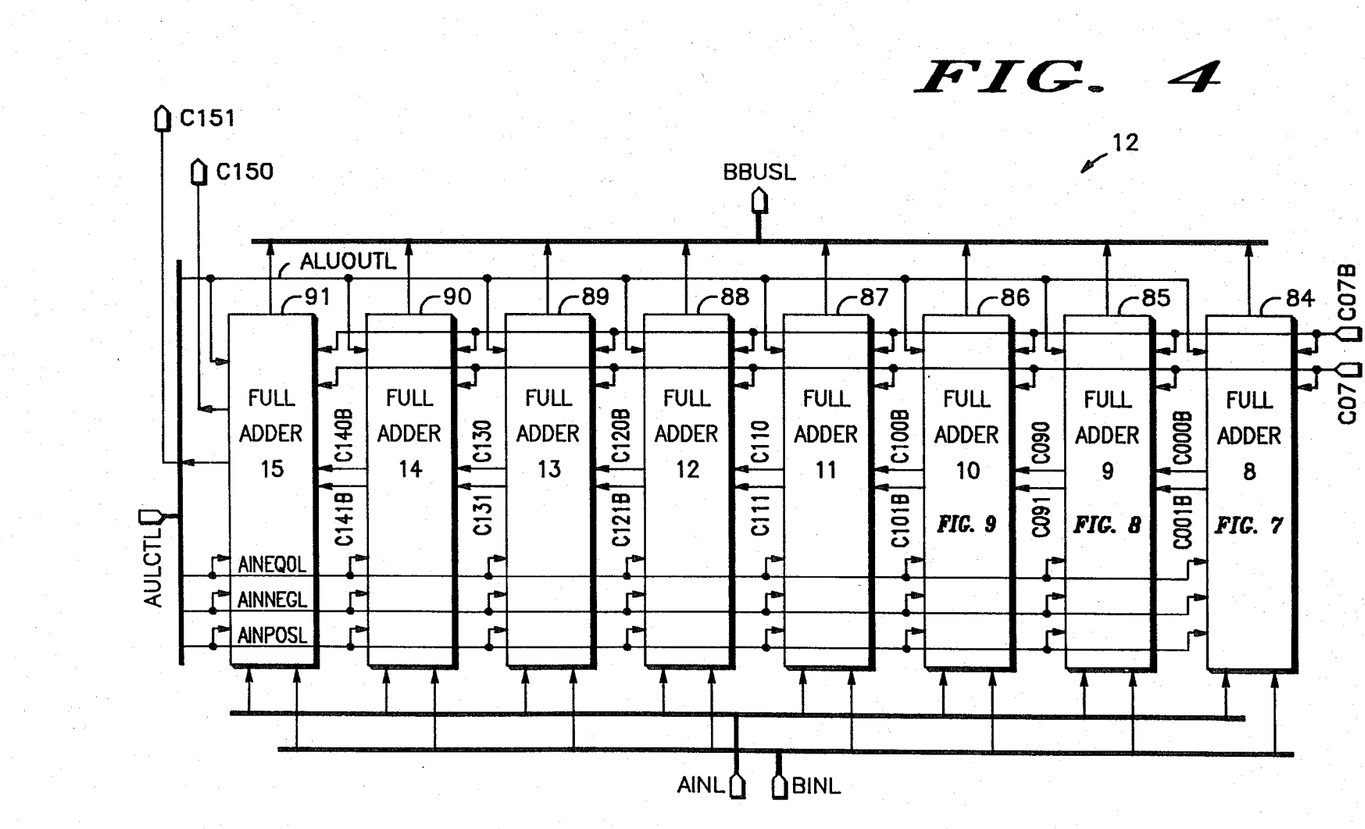
FIG. 4 illustrates in block diagram form a second complete section adder of the n-bit adder circuit of FIGS. 1(*a*) and 1(*b*)

Shown in FIG. 4 is section adder 12 of FIG. 1(a). Section adder 12 comprises full adders 84–91. The block diagram of section adder 12 is analogous to that of section adder 11. However, the operation of section adder 12 and higher ranked section adders is not exactly analogous to the operation of section adder 11 as explained above. Therefore, a detailed description of the operation of section adder 12 follows below for full adders 84–86.

Figure 5:
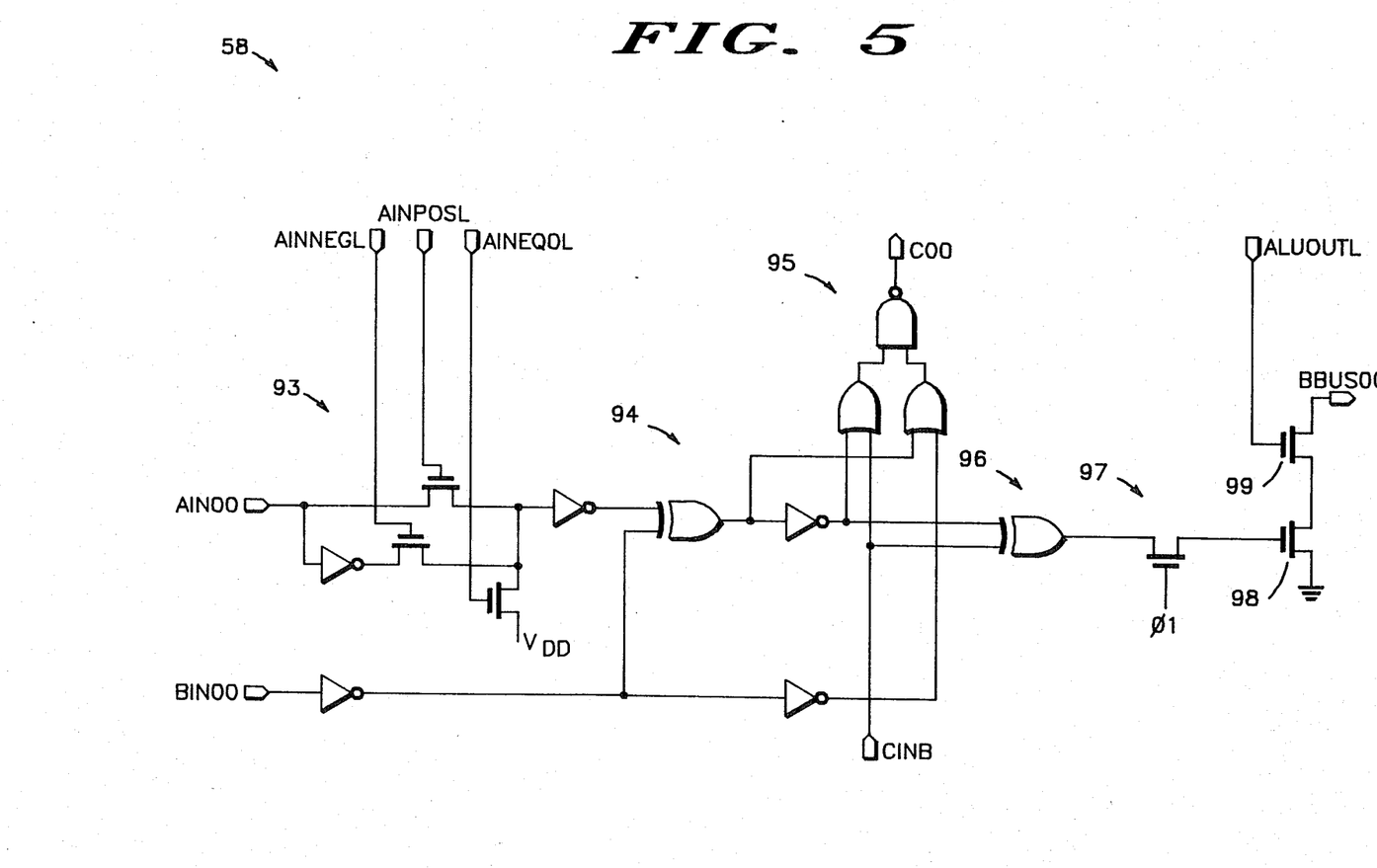
FIG. 5 illustrates in schematic form a first full adder of the complete section adder shown in FIG. 3.

Shown in FIG. 5 is a schematic diagram of full adder 58 corresponding to bit zero of the sum provided by section adder 11. An input portion 93 has a first input for receiving bit zero of number A, AIN00, a second input for receiving bit zero of number B, BIN00, and first and second outputs. Control signals AINNEGL, AINPOSL and AINEQ0L control the data and logic polarities. A half adder 94 has first and second inputs coupled to the first and second outputs of input portion 93, respectively, and an output. Carry-out logic means 95 are coupled to the second output of input portion 93, to the output of half adder 94, and to the complement carry-in bit, CINB. Carry-out logic means 95 have an output for providing the carry-out bit for bit zero. The output of half adder 94 and carry-in bit CINB are coupled to first and second inputs of a half adder 96. An output of half adder 96 is coupled to a transfer gate 97 which is controlled by a signal $\phi_1$ shown in FIG. 2. Transfer gate 97 is coupled to a control electrode of a switch 98. Switch 98 is coupled to a switch 99 which provides a complement sum bit for bit zero and which is controlled by output control signal ALUOUTL.

In operation, full adder 58 in response to input bits AIN00 and BIN00 provides a carry-out bit and a sum bit which corresponds to bit zero of the sum provided by section adder 11. Assume for the purpose of illustration only, that initially the carry-in bit is zero. This means that CINB is one. Further, assume that the input bits A and B are negative inputs so that AINPOSL controls input portion 93. It can be readily shown that when AIN00 and BIN00 are both one, C00 is zero and BBUS00 is one. When only one of AIN00 and BIN00 is one, C00 is zero and BBUS0 is zero. When both AIN00 and BIN00 are zero, C00 is one and BBUS00 is one. Assume, however, that the carry-in bit is one or that CINB is zero. It can readily be shown that when AIN00 and BIN00 are both one, C00 is zero and BBUS00 is zero. When only one of AIN00 and BIN00 is one, C00 is one and BBUS00 is one. When both AIN00 and BIN00 are zero, C00 is one and BBUS00 is zero. Logic means 95 may be fabricated as a single OR-NAND complex logic gate having only a single gate delay.

Figure 6:
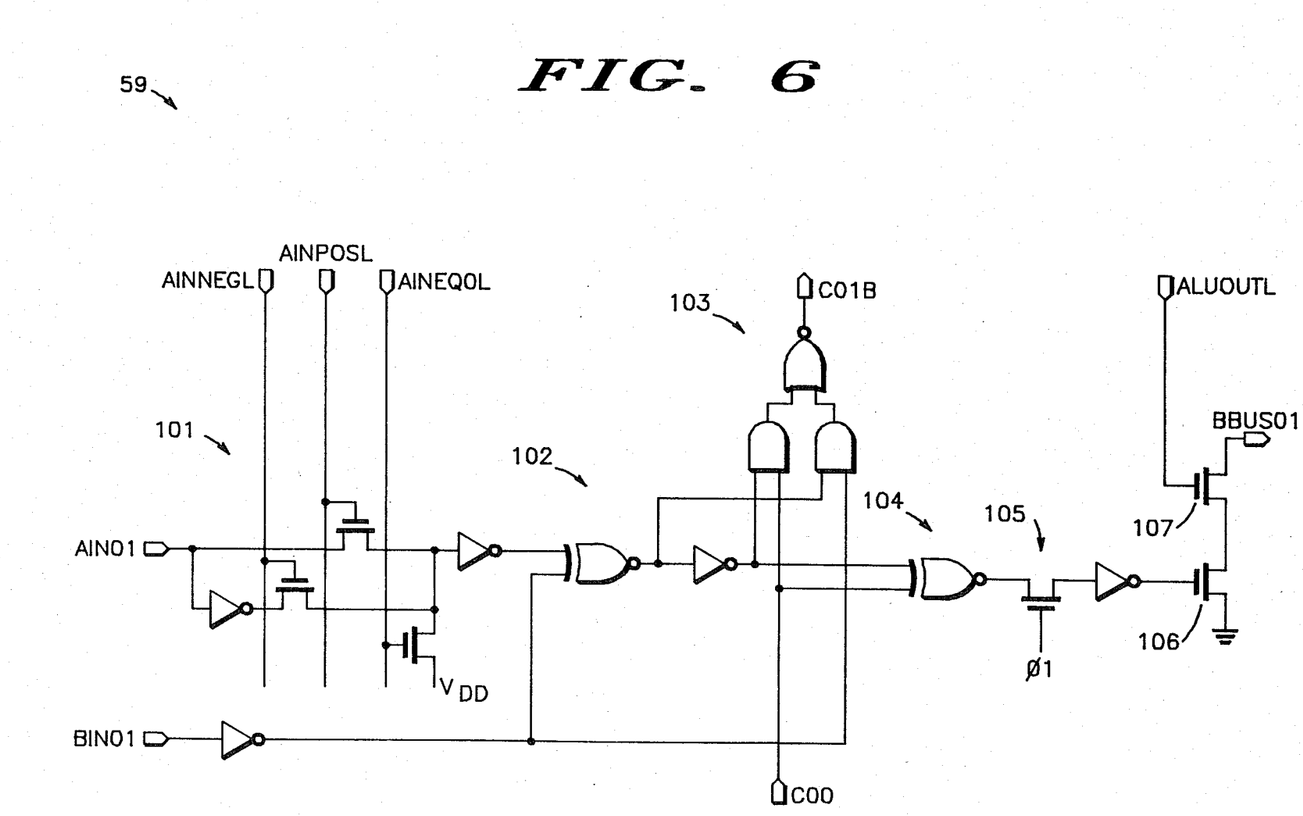
FIG. 6 illustrates in schematic form a second full adder of the complete section adder shown in FIG. 3.

Shown in FIG. 6 is a schematic diagram of full adder 59 corresponding to bit one of the sum provided by section adder 11. An input portion 101 has a first input for receiving bit one of number A, AIN01, and a second input for receiving bit one of number B, BIN01, and first and second outputs. Control signals AINNEGL, AINPOSL and AINEQ0L control the data and logic polarities. A half adder 102 has first and second inputs coupled to the first and second outputs of input portion 101, respectively, and an output. Carry-out logic means 103 are coupled to the second output of input portion 101, to the output of half adder 102, and to a carry-in bit which is the carry-out bit for bit zero of full adder 58, C00. Carry-out logic means 103 have an output for providing the complement carry-out bit for bit one, C01B. The output of half adder 102 and carry-in bit C00 are coupled to first and second inputs of a half adder 104. An output of half adder 104 is coupled to a transfer gate 105 which is controlled by signal $\phi_1$. Transfer gate 105 is coupled to a control electrode of a switch 106. Switch 106 is coupled to a switch 107 which provides a complement sum bit for bit one and which is controlled by output control signal ALUOUTL.

In operation, full adder 59 provides only one complement carry-out bit and a sum bit corresponding to bit one of the sum provided by section adder 11 in response to input bits AIN01 and BIN01. Assume, for the purpose of illustration only, that initially carry-in bit C00 is zero. Further, assume that the input bits A and B are negative inputs so that AINPOSL controls input portion 101. It can be readily shown that when AIN01 and BIN01 are both one, C01B is one and the complement sum bit for bit one, BBUS01, is one. When only one of AIN01 and BIN01 is one, C01B is one and BBUS01 is zero. When both AIN01 and BIN01 are zero, C01B is zero and BBUS01 is one. Assume, however, that the carry-in bit C00 is one. It can be readily shown that when AIN01 and BIN01 are both one, C01B is one and BBUS01 is zero. When only one of AIN01 and BIN01 is one, C01B is zero and BBUS01 is one. When both AIN01 and BIN01 are zero, C01B is zero and BBUS01 is zero. Logic means 103 may be fabricated as a single AND-NOR complex logic gate having only a single gate delay. The carry-out bit of full adder 59 is complemented. It should be noted that full adders 60, 62 and 64 are identical to full adder 58 described above and that full adders 61, 63 and 65 are identical to full adder 59 described above.

Figure 7:
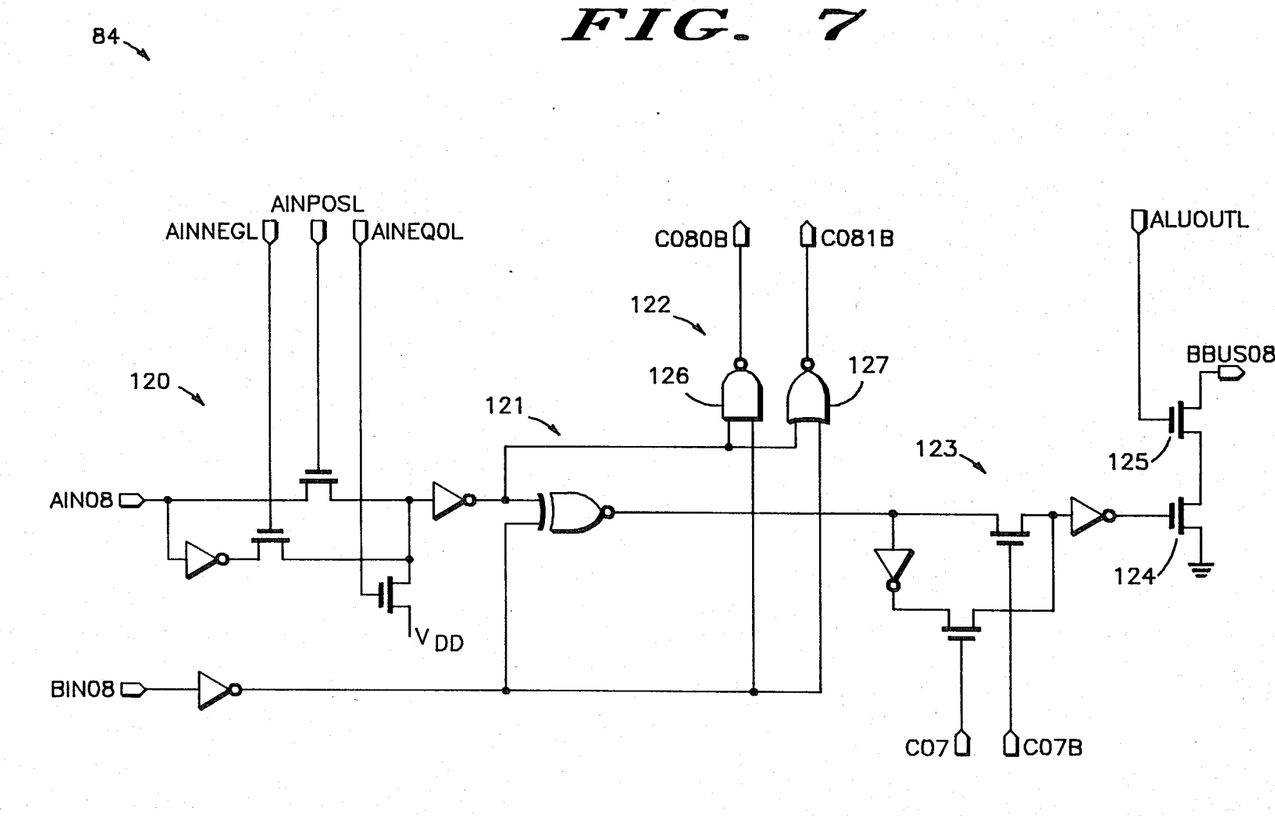
FIG. 7 illustrates in schematic form a first full adder of the complete section adder shown in FIG. 4.

Shown in FIG. 7 is a schematic diagram of full adder 84 for providing bit eight of the sum provided by section adder 12. An input portion 120 has a first input for receiving bit eight of number A, AIN08, a second input for receiving bit eight of number B, BIN08, and first and second outputs. Control signals AINNEGL, AINPOSL and AINEQ0L control the data and logic polarities. A half adder 121 has first and second inputs coupled to the first and second outputs of input portion 120, respectively, and an output. Carry-out logic means 122 have inputs coupled to the first and second outputs of input portion 120, and first and second outputs for providing forced carry-out bits of zero and one in complement form, C080B and C081B, respectively. The output of half adder 121 is coupled to first and second inputs of a multiplexer 123 which is controlled by a carry sum select bit C07 which is the carry-out bit of section adder 11 and the complement thereof. An output of multiplexer 123 is coupled to a control electrode of a switch 124. Switch 124 is coupled to an output bus for providing an output sum bit, BBUS08, via a switch 125 which is controlled by signal ALUOUTL. The output sum bit BBUS08 is the complement of the eighth bit of the sum of the numbers A and B.

In operation, full adder 84 provides two carry-out bits in response to input bits from numbers A and B. Whether or not a forced zero carry-out complement bit, C080B, or a forced one carry-out complement bit, C081B, is provided for the lowest order bit of full adder 84 of section adder 12 depends solely upon what AIN08 and BIN08 input bits are received because the lowest order bit has no carry-in for carry-out bit purposes. Also, since full adder 84 is the lowest ordered adder of section 12, only a single half adder, specifically half adder 121, is required to provide a sum bit of input bits AIN08 and BIN08. Two sums are actually provided at multiplexer 123. The carry sum select bit of section adder 11 affects the value of the sum bits of section adder 12. Therefore, a sum bit for both a zero and a one carry sum select from section adder 11 is provided at multiplexer 123 and only one is coupled to the output bus. Carry-out bits C0808 and C081B which are forced carry-out bits in complement form for both sums respectively, are both coupled to the next higher ranked full adder. In this embodiment half adder 121 provides a sum bit. Assume, for the purpose of illustration only, that initially the carry sum select bit C07 is zero and C07B is one. Further, assume that the input bits A and B are negative inputs so that AINPOSL controls input portion 120. It can readily be shown that when AIN08 and BIN08 are both one, C080B is one, C081B is one and BBUS08 is one. When only one of AIN08 and BIN08 is one, C080B is one, C081B is zero and BBUS08 is zero. When AIN08 and BIN08 are both zero, C080B is zero, C081B is zero and BBUS08 is one. Assume, however, that the carry sum select bit C07 is one. It can be readily shown that the C080B and C081B outputs will remain the same as for the example of a carry-in of zero. However, when both AIN08 and BIN08 are one, BBUS08 is zero. When only one of AIN08 and BIN08 is one, BBUS08 is one; and when both AIN08 and BIN08 are zero, BBUS08 is zero. Logic means 122 comprise, in a preferred form, only a NAND gate 126 for the forced zero carry-out bit and a NOR gate 127 for the forced one carry-out bit. Therefore, only one gate delay exists for each respective carry-out bit. However, the carry-out bit is provided in complement form.

Figure 8:
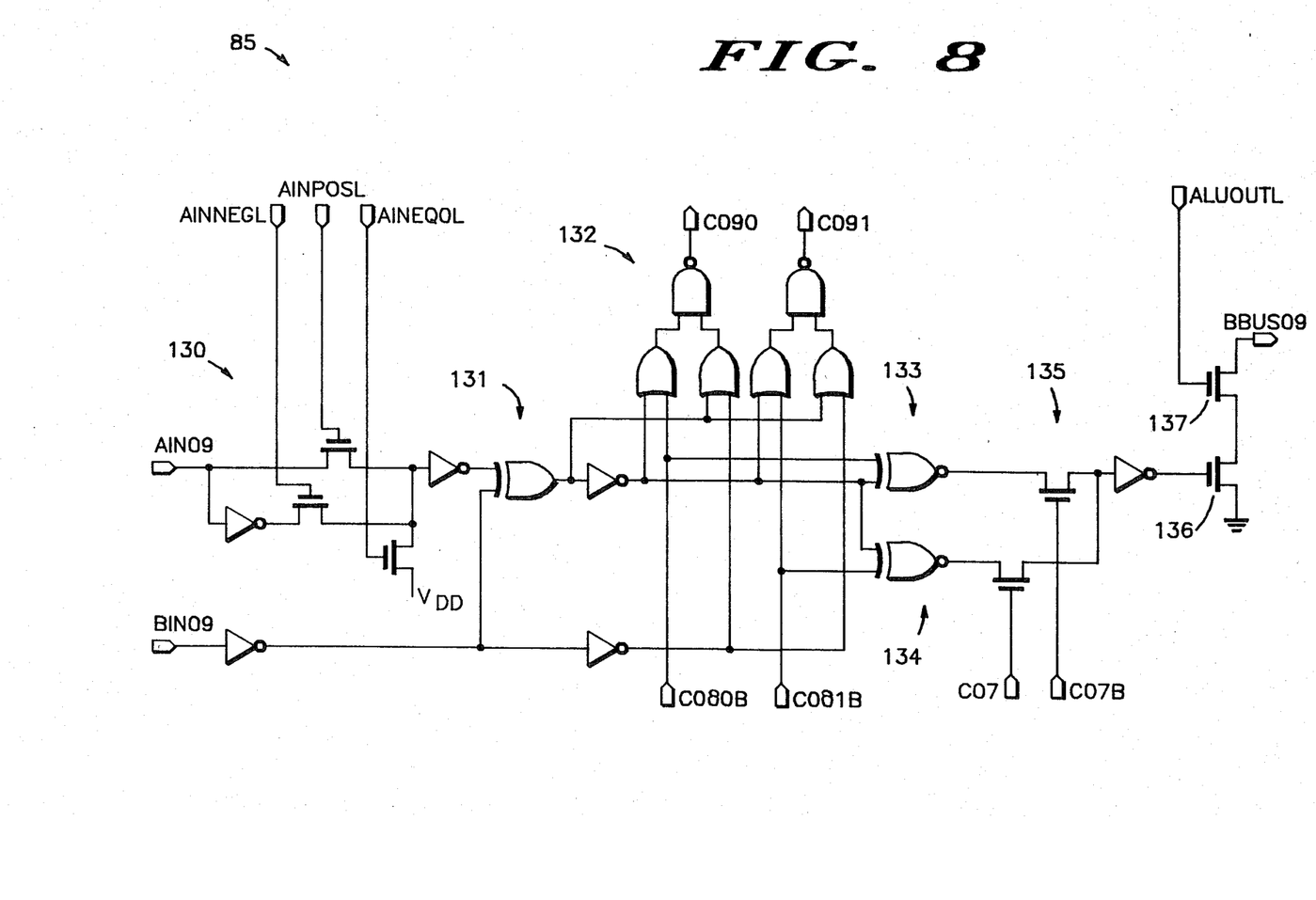
FIG. 8 illustrates in schematic form a second full adder of the complete section adder shown in FIG. 4.

Shown in FIG. 8 is a schematic diagram of full adder 85 for providing bit nine of the sum provided by section adder 12. An input portion 130 has a first input for receiving bit nine of number A, AIN09, a second input for receiving bit nine of number B, BIN09, and first and second outputs. Control signals AINNEGL, AINPOSL and AINEQ0L control the data and logic polarities. A half adder 131 has first and second inputs coupled to the first and second outputs of input portion 130, respectively, and an output. Carry-out logic means 132 have inputs coupled to the second output of input portion 130, to the output of half adder 131, and to carry-in bits C080B and C081B which are the forced carry-out bits of full adder 84. Carry-out logic means 132 have first and second outputs for providing a carry-out of the forced 0 carry chain and a carry-out of the forced 1 carry chain. The output of half adder 131 is also coupled to first inputs of half adders 133 and 134. A second input of half adder 133 is coupled to forced zero carry-in bit C080B. A second input of half adder 134 is coupled to the forced one carry-in bit C081B. Half adders 133 and 134 have outputs which are coupled to first and second inputs, respectively, of a multiplexer 135. Multiplexer 135 is controlled by the carry sum select bit C07 of section adder 11 and the complement thereof. An output of multiplexer 135 is coupled to a control electrode of a switch 136. Switch 136 is coupled to an output bus for providing an output sum bit, BBUS09, via a switch 137 which is controlled by signal ALUOUTL. The output sum bit at BBUS09 is bit number nine of the sum of the numbers A and B.

In operation, full adder 85 also provides two carry-out bits in response to input bits from numbers A and B and to carry-in bits from full adder 84. Again, whether or not the forced zero carry-out bit, C090, and the forced one carry-out bit, C091, is provided as a logic one or zero depends upon the value of the input bits and the carry-in bits from full adder 84. Both carry-out bits C090 and C091 are coupled to the next higher ranked full adder 86. The value of the output sum bit depends upon the value of the input bits, the value of the carry-in bits, and the value of the carry sum select bits C07 and C07B from section adder 11. Two sum bits are created by half adders 133 and 134, and the correct sum bit is determined by multiplexer 135 in resonse to C07. It can be readily ascertained that both C090 and C091 are zero when both negative inputs AIN09 and BIN09 are one because a carry-in of either one or zero will not propagate a carry-out of one. Similarly, when AIN09 and BIN09 are both zero, both C090 and C091 will be one regardless of the carry-in bits because the two input bits of one will create a carry-out for either type of carry-in. When AIN09 is one and BIN09 is zero, the C090 bit is equal to the complement of C080B and the C091 bit is equal to the complement of C081B. Therefore, when only one of AIN09 and BIN09 is one, the carry-in bits are propagated to the carry-out bit outputs in complement form. In a preferred form, carry-out logic means 132 are fabricated by two OR-NAND complex logic gates. Therefore, only one logic gate delay exists in each carry bit path. Note however, that the carry-in bit is in complement form and the carry-out bit is not. Assuming carry-in bit C080B is one, it can be further readily ascertained that when both negative inputs AIN09 and BIN09 are one and a carry sum select of zero is chosen by C07B being one, the complement output sum bit BBUS is one. When only one of the negative input bits is one and a carry sum select bit of zero is chosen by C07B being one, the complement output sum bit BBUS09 is zero, and when both of the negative input bits are zero and a carry sum select bit of zero is again chosen, the complement output sum bit BBUS09 is one. Similarly, if carry-in bit C080B is zero, the logic values transferred to BBUS09 are the complement of the values described above for corresponding input values of AIN09 and BIN09.

Figure 9:
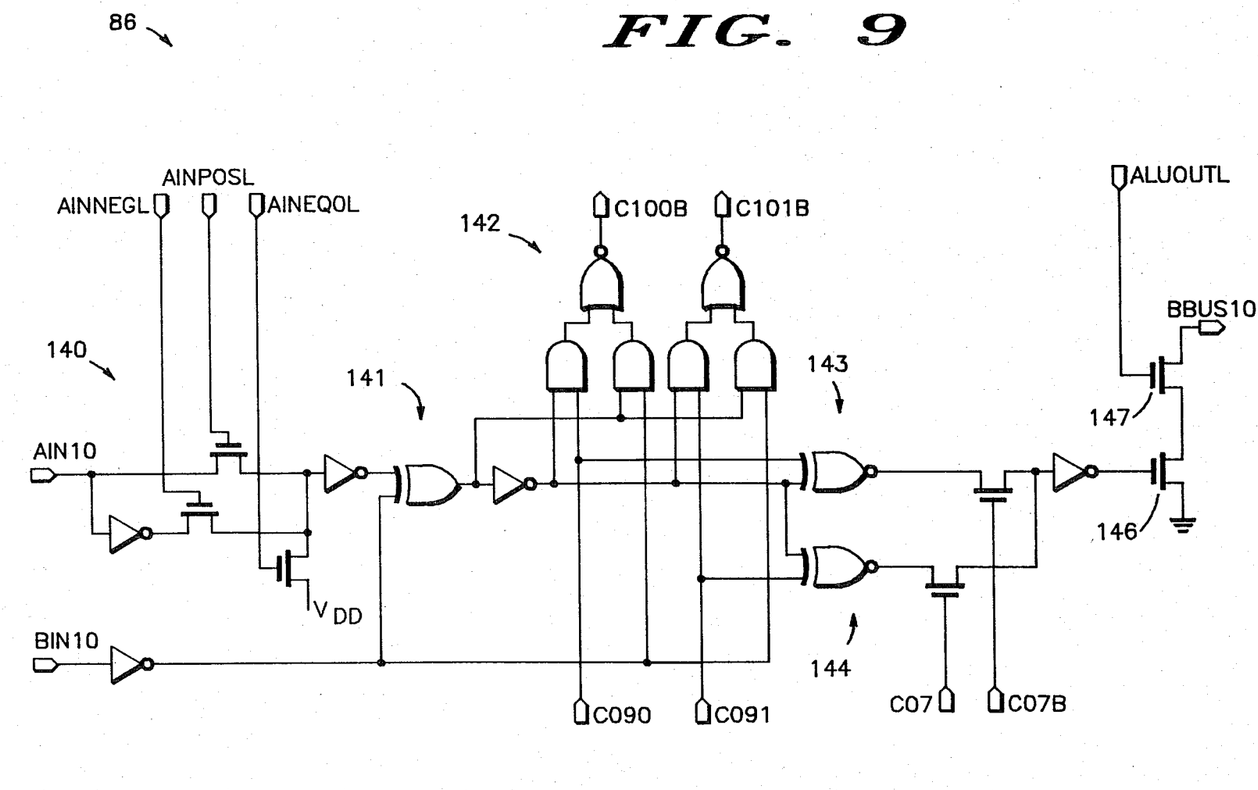
FIG. 9 illustrates in schematic form a third full adder of the complete section adder shown in FIG. 4.

Shown in FIG. 9 is a schematic diagram of full adder 86 for providing bit 10 of the sum provided by section adder 12. An input portion 140 has a first input for receiving bit ten of number A, AIN10, a second input for receiving bit ten of number B, BIN10, and first and second outputs. Control signals AINNEGL, AIN-POSL and AINEQ0L control the data and logic polarities. A half adder 141 has first and second inputs coupled to the first and second outputs of input portion 140, respectively, and an output. Carry-out logic means 142 have inputs coupled to the second output of input portion 140, to the output of half adder 141, and to carry-in bits C090 and C091 which are the carry-out bits of full adder 85. Carry-out logic means 142 have first and second outputs for providing a carry-out of the forced 0 carry chain and a carry-out of the forced one carry chain in complement form, C100B and C101B, respectively. The output of half adder 141 is also coupled to first inputs of half adders 143 and 144. A second input of half adder 143 is coupled to forced zero carry-in bit C090. A second input of half adder 144 is coupled to the forced one carry-in bit C091. Half adders 143 and 144 have outputs which are coupled to first and second inputs, respectively, of a multiplexer 145. Multiplexer 145 is controlled by the carry sum select bit C07 of section adder 11 and the complement thereof. An output of multiplexer 145 is coupled to a control electrode of a switch 146. Switch 146 is coupled to an output bus for providing an output sum bit, BBUS10 via a switch 147 which is controlled by signal ALUOUTL. The output sum bit at BBUS10 is the tenth bit of the sum of the numbers A and B.

In operation, full adder 86 provides two carry-out bits in response to input bits from numbers A and B and to carry-in bits from full adder 85. Once again, whether or not the forced zero carry-out bit, C100B, and the forced one carry-out bit, C0101B, is provided as a logic one or zero depends upon the value of the input bits and the carry-in bits from full adder 85. Both forced carry-out bits C100B and C101B are coupled to the next higher ranked full adder 87 which is not shown in full detail because full adder 87 is analogous to full adder 85 of FIG. 9. The value of the output sum bit depends upon both the value of the input bits, the value of the carry-in bits, and the value of the carry sum select bits C07 and C07B from adder section 11. Two sum bits are created by half adders 143 and 144, and the correct sum bit is determined by multiplexer 145 in response to C07. It can be readily ascertained that both C100B and C101B are zero when both negative inputs AIN10 and BIN10 are zero because a carry-in of either one or zero will propagate a carry-out and make the complement carry-outs zero. Similarly, if both negative inputs AIN10 and BIN10 are one, both C100B and C101B are one because even a carry-in of one will not generate a forced carry-out bit of zero. When only one of the negative inputs AIN10 and BIN10 is one, the carry-out bits C100B and C101B are the complement of the carry-in bits C090 and C091, respectively. In a preferred form, carry-out logic means 142 are fabricated by two AND-NOR complex logic gates. Therefore, only one logic gate delay exists in each carry bit path. Note however, that the carry-in bit is not in complement form but the carry-out bit is. Assuming carry-in bit C090 is zero, it can be further readily ascertained that when both negative inputs AIN10 and BIN10 are one and a carry sum select of zero is chosen by C07B being one, the complement output sum bit BBUS10 is one. When only one of the negative input bits AIN10 and BIN10 is one and a carry sum select bit of zero is chosen by C07B being one, the complement output sum bit BBUS10 is zero. Further, when both negative input bits AIN10 and BIN10 are one and a carry sum select bit of zero is chosen by C07B being one, the complement output sum bit BBUS10 is one. If carry-in bit C090 is one, the logic values transferred to BBUS10 will be the complement of the values shown above for the respective input values of AIN10 and BIN10. It should be noted that full adders 88 and 90 are identical to full adder 86 described above and that full adders 87, 89 and 91 are identical to full adder 85 described above.

By now it should be apparent that all full adders in section adders 12–18 generate two carry bits, one carry bit propagating according to a forced zero carry-in in the lowest ranked bit of the section adder and the other carry bit propagating according to a forced one carry-in in the lowest ranked bit of the section adder. Each full adder also provides two sums for a carry sum select of zero and one, respectively, which can be quickly multiplexed as the carry-in bit CINB propagates through adder circuit 10. In this way, only a first half adder and duplicate second half adders are required to provide two sums.

A further advantage of adder 10 is that both carry propagate and carry select logic is very fast. A method of only having one gate delay in each carry line is provided by alternating carry bits in complement form between full adders of each section adder. This method is also applied to carry select logic between each section adder by alternating carry select bits in complement form and obtaining a minimum gate delay. Not only does this method speed up the calculation of adder 10, but circuit size is also reduced.

It should be further noted that the disclosed method of minimizing carry logic by alternating logic functions and providing a carry bit in complement form every other stage may be used with any circuit having carry logic, such as an incrementor circuit. Although in the preferred embodiment a method of reducing carry logic in an adder circuit is disclosed, this method is not intended to be limited to only adder circuits.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

I claim:

1. An n-bit adder circuit, where n is an integer, for simultaneously adding n bits of a first and a second number and simultaneously outputting n sum bits and a carry-out bit in response to a control signal, comprising:

a rank ordered plurality of parallel connected section adders, each of said section adders providing a predetermined portion of said n sum bits and comprising:

a rank ordered plurality of full adder circuits, wherein the n-bit adder circuit comprises only n full adders and each bit of said n sum bits is provided by only one full adder circuit, each full adder circuit of the section adder of lowest rank having a first input for receiving a predetermined bit of said first number, a second input for receiving a predetermined bit of said second number, a carry-in input terminal, the carry-in input terminal of the lowest ranked full adder being adapted for receiving an input carry-in bit, a carry-out output terminal, the carry-out output terminal of each full adder except the highest ranked being coupled to the carry-in input terminal of the full adder of next higher rank, and an output sum terminal, for providing one of said sum bits in response to a rank ordered sum select bit;

each full adder circuit of the remaining section adders having a first input for receiving a predetermined bit of said first number, a second input for receiving a predetermined bit of said second number, first and second carry-in input terminals for respectively receiving the carry-out bit and complement thereof of the highest ranked full adder of the next lower ranked section adder, and first and second carry-out output terminals corresponding respectively to carry-out bits of zero and one, all full adders of the remaining section adders and of rank greater than the lowest rank having third and fourth carry-in input terminals coupled to the first and second carry-out bit terminals of the full adder of immediately lower rank; and a rank ordered plurality of carry sum select logic means, for providing said rank ordered sum select bits associated with the sum of the first and second input numbers, the lowest ranked carry sum select logic means having an input coupled to the carry-out output terminal of the highest ranked full adder of the next to lowest ranked section adder and an output coupled to the first and second carry-in input terminals of the lowest ranked full adder of the next higher ranked section adder, the highest ranked carry sum select logic means having an input coupled to the carry-out terminals of the highest ranked full adder of all section adders and an output for providing the carry-out bit, and the remainder of the rank ordered carry sum select logic means each having an input coupled to the carry-out output terminals of the highest ranked full adders of predetermined section adders and an output coupled to a carry-in input terminal of the lowest ranked full adder of a predetermined section adder.

2. The n-bit adder circuit of claim 1 wherein each full adder of the rank ordered plurality of full adders of the section adder of lowest rank further comprises:

a first half adder having a first input for receiving a predetermined bit of said first number, a second input for receiving a predetermined bit of said second number, and an output;

carry bit logic means having first and second inputs coupled to the output of said first half adder, a third input of the lowest ranked full adder coupled to said input carry-in bit and a third input of the remaining full adders of the section adder of lowest rank coupled to a carry-in bit of next lower rank, a fourth input coupled to the predetermined bit of said second number, and an output for providing said ranked carry-out bit; and a second half adder having a first input coupled to the output of said first half adder, a second input coupled to the third input of said carry bit logic means, and an output for providing a ranked sum bit associated with the lowest ranked section adder.

3. The n-bit adder circuit of claim 2 wherein predetermined full adders of the rank ordered plurality of parallel connected full adders provide both a first sum of said predetermined bits of said first and second numbers corresponding to the presence of a ranked carry-in bit in a first logic state, and a second sum of said predetermined bits of said first and second numbers corresponding to the presence of a ranked carry-in bit in a second logic state, and couple only one of said first and second numbers to said output sum terminal in response to the output of a carry-out terminal of a predetermined section adder of lower rank.

4. The n-bit adder circuit of claim 1 wherein the lowest ranked full adder of each section adder having a rank greater than lowest rank comprises:
- a half adder having a first input for receiving a predetermined bit of said first number, a second input for receiving a predetermined bit of said second number, and an output, for providing a rank sum bit in response to said sum select bit provided by the carry sum select logic means; and
- carry bit logic means having first and second inputs coupled to the predetermined bits of said first and second numbers, and first and second outputs for providing said ranked carry bit corresponding to a zero and a one carry, respectively.

5. The n-bit adder circuit of claim 1 wherein each full adder except the lowest ranked full adder of each section adder having a rank greater than the lowest rank further comprises:
- a first half adder having a first input for receiving a predetermined bit of said first number, a second input for receiving a predetermined bit of said second number, and an output;
- carry bit logic means having first, second, third and fourth inputs respectively coupled to the predetermined bits of said first and second numbers and to two predetermined carry-in bits corresponding to one and zero input carry-in bits, respectively, and first and second outputs for providing said ranked carry-out bit corresponding to a zero and a one input carry-in bit respectively;
- a second half adder having a first input coupled to the output of said first half adder, a second input coupled to the predetermined carry-in bit corresponding to an input carry-in bit of one, and an output for providing a first sum bit in response to a predetermined sum select bit; and
- a third half adder having a first input coupled to the output of said first half adder, a second input coupled to the predetermind carry-in bit corresponding to an input carry-in bit of zero, and an output for providing a second sum bit in response to said predetermined sum select bit, wherein each full adder only provides one output sum bit.

6. The n-bit adder circuit of claim 1 wherein each of said parallel connected full adders except the lowest ranked full adder of the section adders having a rank greater than the lowest rank, comprises:
- a first half adder having first and second inputs coupled to a predetermined bit of each of said first and second numbers, respectively, and an output, for providing, in part, a predetermined carry-out bit; and
- a second half adder having a first input coupled to the output of said first half adder, a second input coupled to a predetermined carry-in bit, and an output, for providing a predetermined bit of the sum of said first and second numbers.

7. The n-bit adder circuit of claim 6 wherein the lowest ranked full adder of each section adder having a rank greater than the lowest rank comprises a single half adder having first and second inputs coupled to a predetermined bit of said first and second numbers, respectively, and an output, for providing the lowest ranked sum bit of the respective section adder.

8. The n-bit adder circuit of claim 1 wherein predetermined fully adders of the rank ordered plurality of parallel connected full adders comprise:
- a first half adder having first and second inputs coupled to the predetermined bit of said first and second numbers, respectively, and an output for providing, in part, said ranked carry-out bit;
- a second half adder having a first input coupled to the output of said first half adder, a second input coupled to a predetermined ranked carry-in bit in a first logic state, and an output, for providing said predetermined bit of the sum of said first and second numbers corresponding to said ranked carry-in bit in a first logic state; and
- a third half adder having a first input coupled to the output of said first half adder, a second input coupled to said ranked carry-in bit in a second logic state, and an output, for providing said predetermined bit of the sum of said first and second numbers corresponding to said ranked carry-in bit in a second logic state.

* * * * *